United States Patent
Schafe

[11] 3,899,718
[45] Aug. 12, 1975

[54] METHOD AND ARRANGEMENT FOR LIMITING THE POWER DISSIPATED IN ELECTRONIC COMPONENTS

[75] Inventor: Ulrich Schafe, Erlangen, Germany

[73] Assignee: Siemens Aktiengesellschaft, Munich, Germany

[22] Filed: Jan. 28, 1974

[21] Appl. No.: 437,228

[30] Foreign Application Priority Data
Feb. 7, 1973 Germany............................ 2306013

[52] U.S. Cl................................. 317/33 R; 323/9
[51] Int. Cl. ............................................. H02h 7/20
[58] Field of Search ............... 317/31, 33 R, 33 UR; 323/9

[56] References Cited
UNITED STATES PATENTS

| | | |
|---|---|---|
| 3,345,554 | 10/1967 | Lupoli............................ 323/9 X |
| 3,366,871 | 1/1968 | Connor................................. 323/9 |
| 3,534,249 | 10/1970 | Neill et al. ......................... 323/9 X |
| 3,538,426 | 11/1970 | Jones................................... 323/9 |
| 3,577,049 | 5/1971 | Madurski et al................. 323/9 UX |
| 3,703,679 | 11/1972 | Heidt................................ 317/33 UR |

*Primary Examiner*—A. D. Pellinen
*Attorney, Agent, or Firm*—Kenyon & Kenyon Reilly Carr & Chapin

[57] ABSTRACT

A method and apparatus for limiting the dissipated power of an electronic component in case of excessive load current, in which the load current is first allowed to remain switched on as it increases above a threshold, the current then limited to a maximum value and the load current switched off, only if it remains above the threshold value for a predetermined period of time and after a second time interval, the current is automatically switched on again.

7 Claims, 3 Drawing Figures 3,899,718

METHOD AND ARRANGEMENT FOR LIMITING THE POWER DISSIPATED IN ELECTRONIC COMPONENTS

BACKGROUND OF INVENTION

This invention relates to protective devices in general, and more particularly to a method and apparatus for limiting the power dissipation of electronic components in a case of excessive load current. For the protection of heat sensitive electronic components such as semiconductor elements in the case of short circuits or over currents in the load circuit, fusing circuits have previously been developed which rapidly interrupt the load current. Also previously developed are reclosing devices which attempt to switch the current on again periodically after it has been switched off. Such devices operate to switch the current back on only when the overload has been removed. Devices of this type have disadvantages when used with circuits which contain elements which have a high initial current such as, for example, capacitive loads or incandenscent lamps. The transient occuring at turn-on makes the fusing circuit respond, interrupting the current immediately. If reclosing is attempted, the transient occurs again, and again causes the circuit to open.

One method of preventing this effect is through the use of delayed fusing device. Such devices are designed so that the fusing circuit becomes effective only after the normal closing transient has decayed. However, with such devices, a danger exists that, when a true short circuit occurs in the load circuit, the dissipated power produced during the delay period will have been sufficient to destroy the electronic component. Furthermore, fusing circuits with delayed response are not suited for electronic components which can be destroyed even by a high closing transient. Such is the case, for example, with integrated circuits.

Thus, it can be seen that there is a need for a method and circuit for limiting the dissipation in electronic components in such a manner that neither the high closing transients nor permanent short circuit currents can lead to the destruction of the component.

SUMMARY OF INVENTION

In the method of the present invention, such is accomplished by providing that the load current remains switched on, even as it rises above a first threshold value, but that it is limited to a maximum value. It is switched off only after a predetermined period of current flow above the first threshold and is then switched on again after a second predetermined time interval after being switched off. This method of operation provides three independent quantities which may be varied, i.e., the maximum value of current, the period of current flow and the time interval between turning off and turning on. This permits the method of the present invention to be adapted to many different applications and in addition, allows response sensitivity to be adjusted through appropriate choice of the threshold value.

When used for limiting the power dissipation of controlled electronic amplifier components such as transistors, one illustrated embodiment of the invention operates to switch the load current off and then on again through an action on the driver transistor. As a result, it is not necessary to limit or switch the large load current, but only the substantially smaller control current.

DETAILED DESCRIPTION OF THE PREFERRED EMBODIMENT

Figure 1:
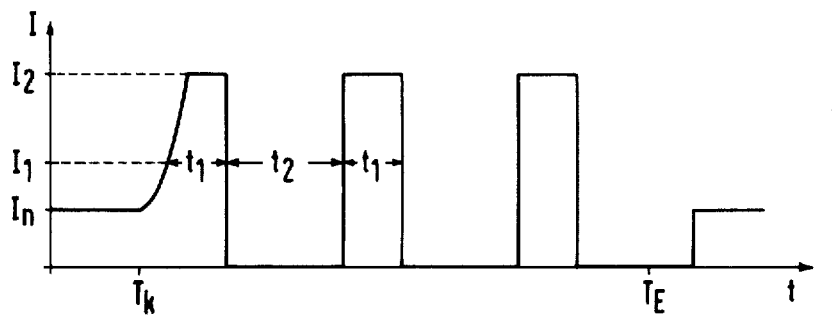
FIG. 1 is a plot of current versus time illustrating typical operation of the circuit of the present invention.

FIG. 1 illustrates typical operation according to the method of the present invention. As shown, normal load current $I_n$ flows up to the time $T_k$. At the time $T_k$ a short circuit develops, causing a rise in the current. At the point where the threshold value $I_1$ is reached, the current flow period $t_1$ starts. At the end of the period $t_1$, the current is switched off if it still exceeds the threshold value $I_1$. During the current flow period $t_1$, the current is limited to the maximum value $I_2$, so that a defined current-time area is not exceeded. At the end of the second time interval $t_2$, the current is again switched on. As illustrated, the short circuit still persists, and the current is again switched off after a period $t_2$. Operation of this nature is continued until at the time $T_E$ the short circuit is removed and at the next cycle of reclosing, the current threshold value $I_1$ is no longer exceeded.

Through suitable choice of the maximum value $I_2$, the current flow time $t_2$ and the interval time $t_2$, the mean dissipation can be controlled in such a manner that even a permanent short circuit cannot destroy the electronic component to be protected. The mean power dissipation produced is smaller than in the case of simple limitation of the load current, by a factor which can be derived from the ratio of the current flow period to the interval time.

The above described method for limiting power dissipation in electronic components is particularly advantageous in load circuits having elements which generate so high an inrush current that the latter would destroy the electronic component. Such occurs, for example, with capacitive loads or with incandescent lamps. For an incandescent lamp in the load circuit, one will, for example, choose the interval time so that the incandescent wire does not completely cool down at the time of reclosing so that thereby its resistance remains higher than the cold resistance.

Figure 2:
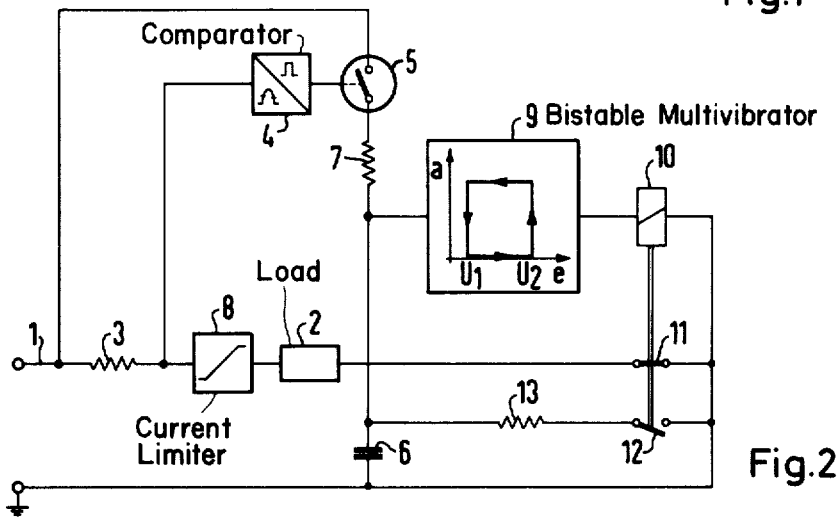
FIG. 2 is a block diagram of the preferred embodiment of the present invention.

A circuit arrangement for implementing the method of the present invention is shown in block diagram form on FIG. 2. In general, this arrangement comprises a limiter circuit for the maximum load current and a threshold detector which triggers a time delay member when the threshold is exceeded, which delay member turns off the load current at the end of a predetermined time and includes means to switch the current back on at the end of a second predetermined time in the manner described above.

Advantageously, the time delay device will include a capacitor whose charging voltage influences a multivibrator (flip-flop) with an adjustable, automatically switching upper and lower switching threshold, which multivibrator interrupts the load current at its upper switching threshold and switches it on again at its lower switching threshold.

FIG. 2 shows such an arrangement. A measuring resistor 3 is coupled to one of the inputs of a load circuit 1 having as a load, an electronic component 2 which must be protected. Normally, current will flow from the point 1 through resistor 3, through a current limiter 8, through the load 2 and a switch contact 11 back to ground. As long as current is normal, this current path will be maintained. However, as soon as the load current exceeds a predetermined threshold value $I_1$ of FIG. 1, a comparator 4 will be triggered. The output of comparator 4 is coupled to a switch 5 and acts to close it, thereby establishing a charging path through resistor 7 for capacitor 6. The load current to the load 2 is limited by a limiter circuit designated 8. The capacitor output voltage is coupled to the input of a multivibrator 9 which has a lower threshold switching voltage $U_1$ and an upper thresold switching voltage $U_2$. When the capacitor 6 has reached the upper threshold switching voltage $U_2$, the multivibrator 9 changes state and actuates a relay or other switching device 10. This interrupts the contact 11 in load circuit 1 and closes the contact 12 to provide a discharge path through resistor 13 for the capacitor 6. With the load current interrupted, the comparator 4 will change state causing the switch 5 to open to terminate the charging of the capacitor 6. Capacitor 6 will continue to discharge until the lower switching threshold voltage $U_1$ is reached. At this point, the multivibrator 9 will flip and deenergize the relay 10, causing the contact 11 to close and the contact 12 to open. The load current will now flow again. If an overload still occurs and a threshold value across the resistor 3 is still exceeded, the process will be repeated and continued to be repeated until the overload is removed.

The time for the capacitor 6 to charge to the voltage $U_2$ represents the current flow period $t_1$ of FIG. 1. The time for discharge of capacitor 6 from the upper switching threshold voltage $U_2$ to the lower switching threshold voltage $U_1$ represents the interval time $t_2$ of FIG. 1. It should be noted that during the first response of the circuit, the current flow period is slightly longer since the capacitor voltage must get from zero to the voltage $U_1$ during this period. Such will not, however, affect the effectiveness of the circuit arrangement.

Figure 3:
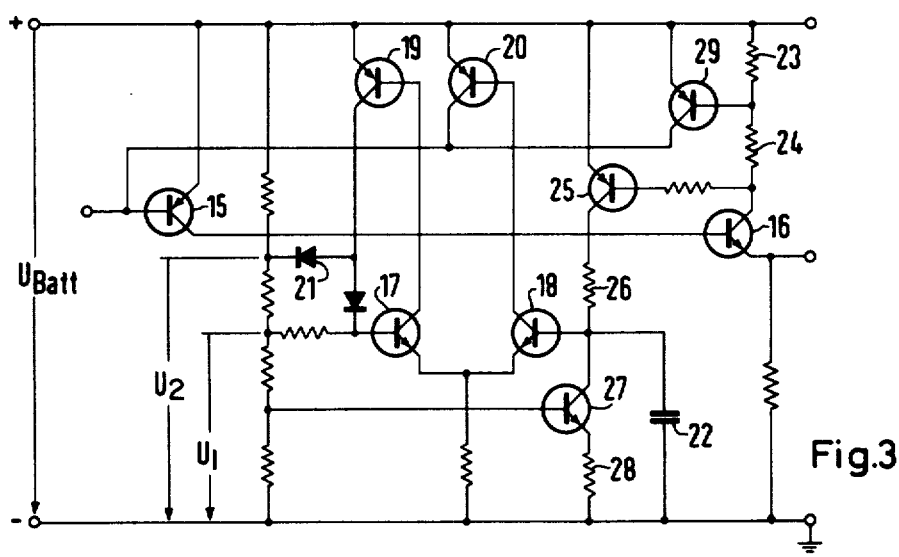
FIG. 3 is a circuit diagram illustrating an embodiment of FIG. 2 for use with a controlled electronic amplifier component.

A more detailed embodiment of the invention is illustrated by FIG. 3. This arrangement includes an output transistor 16 driven by a driver transistor 15. The circuit shown protects this arrangement against excessively high load currents using the method described above. As will become evident, the method operates on the drive of the transistor 16 and thus, is not required to switch large load currents. The above described multivibrator comprises the transistors 17 and 18 which have their emitters tied together and grounded through a resistor. Transistor 17 drives the transistor 19 which switches the switching threshold voltage present at the base of transistor 17. Transistor 18 drives the transistor 20 which is capable of interrupting the load current by acting on the driver transistor 15. In normal operation, the transistor 17 is conducting and the transistor 18 cutoff. The voltage $U_2$ which is derived from the supply voltage $U_{Batt}$ via the transistor 19 and overflow diode 21 is applied to the base of the transistor 17. The capacitor 22 corresponding to capacitor 6 of FIG. 2 is discharged.

As soon as the load current increases above the threshold value $I_1$, the voltage drop across two series-measuring resistors 23 and 24 will exceed the threshold cutoff voltage of transistor 25. This will cause transistor 25 to conduct and supply current through resistor 26. A small, constant percentage of this current flows through the transistor 27 and resistor 28 which comprise the discharge path for capacitor 22. This discharge path is made up of these two elements which comprise a current sink which is constantly on. The remaining portion of the current provided by transistor 25 through resistor 26, charges the capacitor 22. The use of a continuously conducting constant current signal made up of transistor 27 and resistor 28, has as its advantage that no switch is required for the discharge path of capacitor 22. Furthermore, the capacitor 22 is always discharged completely if the voltage does not reach the upper switching threshold voltage $U_2$ of the multivibrator made up of transistors 17 and 18 due to the excessively high load current dropping below the threshold value before the end of the current flow period. If, however, the current is still above the threshold at the end of the flow period, the voltage at the capacitor 22 reaches the upper switching threshold voltage $U_2$ of the multivibrator made up of transistors 17 and 18. As a result, the multivibrator switches with the transistor 18 conducting and transistor 17 cut off. Transistor 18 drives the transistor 20 into full conductance, which in turn supplies current to the base of the driver transistor 15 thereby blocking the drive of the output transistor 16 and switching off the load current. As a result, transistor 25 is switched off and the charging of capacitor 22 terminated. The capacitor, however, will now discharge through the transistor 27 and resistor 28 until its charge has reached the lower switching threshold voltage $U_1$. This terminates the interval time $t_2$ of FIG. 1 and causes the multivibrator to switch over again and allow the drive for the output transistor 16 to turn it on.

In order to limit the load current to a maximum value $I_2$, the voltage drop at the measuring resistor 23, which drop drives the transistor 29 is used. Transistor 29 controls the current of the driver transistor 15 in such a manner, that the maximum value $I_2$ is not exceeded.

Thus, an improved method and arrangement for practicing that method in which the power dissipation of an electronic component is limited in case of excessive load current has been described. Although specific methods and embodiments have been illustrated and described, it will be obvious to those skilled in the art that various modifications may be made wihtout departing from the spirit of the invention which is intended to be limited solely by the appended claims.

What is claimed is:

1. Apparatus for limiting the power dissipation of an electronic component coupled to a power source in the case of excessive load current comprising:
    a. means to detect a load current exceeding a predetermined threshold value and to provide a first output signal indicative thereof;
    b. means responsive to said first output signal to provide, after a first predetermined first time delay, a second output signal;
    c. said means further adapted to remove said output signal after a second predetermined time interval;
    d. means arranged between said power source and said electronic component responsive to said second output signal for interrupting the load current supplied to said component when said second output signal is present; and e. means interposed between said power source and said component to limit the maximum current flowing during said first predetermined time interval.

2. The arrangement according to claim 1 wherein said means responsive to said first output signal comprise:
   a. a bistable multivibrator having an adjustable automatically switching upper and lower switching threshold adapted to provide said second output signal when said upper threshold is reached and for removing said second output signal when said lower switching threshold is reached after said upper threshold has first been reached;
   b. a capacitor coupled between one side of said power source and the input to said multivibrator;
   c. means responsive to said first output signal to couple the other side of said power source to said capacitor to cause it to charge; and
   d. means responsive to the output of said second output signal to discharge said capacitor.

3. The arrangement according to claim 2 wherein said multivibrator comprises first and second transistors having their emitters tied together and further including a first switch driven by said first transistor and adapted to change the threshold voltage present at the base of said first transistor between said upper and said lower threshold and a second switch driven by the second transistor and coupled to switch said load current.

4. The arrangement according to claim 2 wherein said means for detecting comprise a measuring resistor in the load circuit, the voltage drop of which is coupled to the base of a third transistor which is coupled to said capacitor.

5. The arrangement according to claim 4 wherein the discharge path of said capacitor contains a fourth transistor and a series resistor, said transistor and series resistor forming a current sink.

6. The arrangement according to claim 5 and further including means to cause said fourth transistor to always conduct.

7. The arrangement according to claim 6 wherein said first and second switches comprises fifth and sixth transitors.

* * * * *

UNITED STATES PATENT AND TRADEMARK OFFICE
CERTIFICATE OF CORRECTION

PATENT NO. : 3 899 718
DATED : August 12, 1975
INVENTOR(S) : Ulrich Schäff

It is certified that error appears in the above—identified patent and that said Letters Patent are hereby corrected as shown below:

in column 2, line 26, change " period $t_2$" to --period $t_1$-- in column 3, line 17, change "thresold" to --threshold--

Change the inventor's name to --Ulrich Schäff--

Signed and Sealed this thirtieth Day of December 1975

[SEAL]

Attest:

RUTH C. MASON
*Attesting Officer*

C. MARSHALL DANN
*Commissioner of Patents and Trademarks*